United States Patent [19]

Yamschikov et al.

[11] 4,207,007
[45] Jun. 10, 1980

[54] LIQUID-STIRRING DEVICE AND INSTALLATION FOR TREATING LOOSE MATERIALS

[76] Inventors: Valery S. Yamschikov, ulitsa Profsojuznaya, 98, kv. 123; Vladimir A. Moor, ulitsa Trofimova, 19, korpus 2, kv. 21; Valery I. Rekhtman, Sirenevy bulvar, 43a, kv. 106, all of Moscow; Viktor A. Belozerov, Kashirskaya ulitsa, 56, kv. 9, Domodedovo Moskovskoi oblasti; Oleg P. Smirnov, ulitsa Svobody, 83, korpus 1, kv. 60, Moscow; Vladimir M. Karbachinsky, ulitsa Profsojuznaya, 118, korpus 1, kv. 122, Moscow; Igor A. Nazarov, ulitsa Sevanskaya, 38, kv. 30, Moscow; Gleb N. Pivovarov, Nakhimovsky prospekt, 25, korpus 1, kv. 46, Moscow; Boris S. Raev, Leninsky raion, poselok Barsuki, ulitsa Klubnaya, 1, kv. 2, Tulskaya oblast, all of U.S.S.R.

[21] Appl. No.: 929,783

[22] Filed: Jul. 31, 1978

[51] Int. Cl.² ............................................... B01F 15/02
[52] U.S. Cl. ........................................ 366/275; 68/21; 366/341

[58] Field of Search .............. 366/275, 348, 220, 341, 366/124; 68/21, 27, 96, 242

[56] References Cited

U.S. PATENT DOCUMENTS

| | | | |
|---|---|---|---|
| 2,425,237 | 8/1947 | Fields | 366/29 |
| 2,737,039 | 3/1956 | Wales | 68/21 |
| 3,588,054 | 6/1971 | Herman | 366/275 |
| 3,779,050 | 12/1973 | Olliges, Sr. | 68/21 |

Primary Examiner—Billy S. Taylor
Attorney, Agent, or Firm—Haseltine, Lake & Waters

[57] ABSTRACT

A tubular chamber is divided by a rigid annular partition into two sections. Each section comprises a resilient membrane installed co-axially with the chamber shell with a certain gap relative to the shell to form a cavity communicating with a gas medium source. This cavity accommodates a stationary perforated rigid member installed coaxially with the membrane and the chamber wall to bear the membrane in its extreme expanded state, when no gas medium is supplied into the cavity. When the gas medium is delivered from the source into the cavity, the membranes contract and expand alternately, causing the liquid to move and agitate. An installation for treatment of loose materials is proposed, which is constructed with the use of these liquid-stirring devices.

11 Claims, 7 Drawing Figures

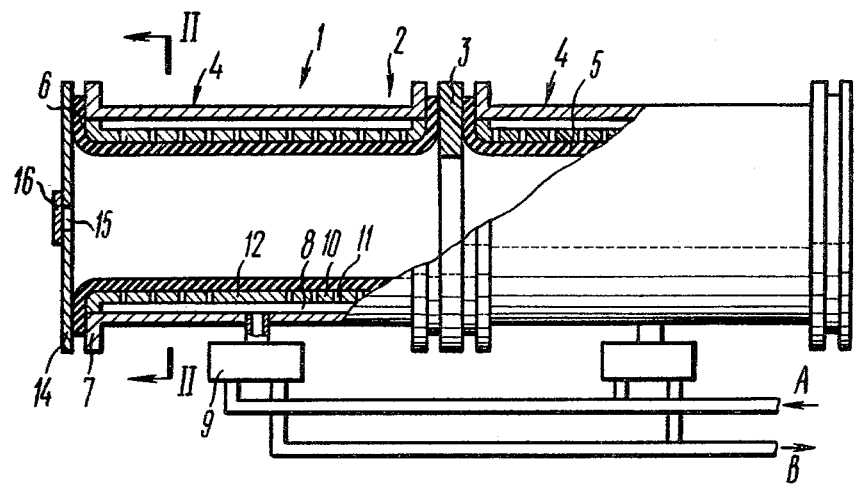
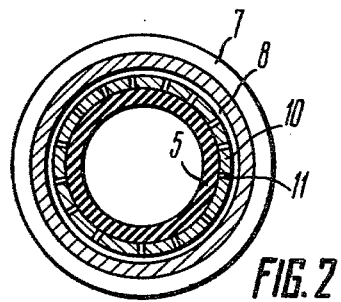

LIQUID-STIRRING DEVICE AND INSTALLATION FOR TREATING LOOSE MATERIALS

The present invention relates to devices for stirring liquids and may be widely used in cases when need arises to carry out washing, cleaning or mixing operations involving thorough agitation of liquids. This invention can be used to advantage in various fields of industry: in mining, for instance, to enrich mineral products; in chemistry, for example, to make suspensions, stir pulp, for dispersing and degreasing; in the food industry, to conduct diffusion cooking; in light industry, for instance, to treat leather or raw textile materials in liquids; in agriculture, for instance, to clean vegetables; in the machine-building industry, for instance, to cleanse machine parts; in domestic facilities and other fields of industry, to intensify mass transfer processes.

The problem of intensive and uniform agitation of liquids has long been of interest for specialists in various fields of engineering. Mixers used for a long time and up to now comprise usually a rotatable shaft carrying blades for agitation of the liquid. However, the devices of this kind tend to be too inefficient and their use is found inexpedient in some cases, for example, in mining for enrichment of mineral products, when need arises to stir large quantities of water together with raw materials. Besides, the flow of the mixture produced by such mixers or impellers is characterized by great non-uniformity in composition and velocity. Therefore, a continuous search for new liquid-stirring methods and devices has been conducted. Known in the art is a widely used device comprising a spring-mounted frame carrying a vessel with liquid and provided with special high-power vibrators designed to cause vibrations of this frame and hence agitation of the fluid. The device of this type, however, features a high power demand and short service life of the vessel filled with liquid and subjected to considerable vibrations. This makes the specialists continue a search for new mixing devices. A novel device came into being in the last decade, which is noted for its simplicity, reliability, high output and comparatively low specific power consumption.

This device is actually a tubular chamber divided by a rigid annular partition into two sections. Each section of the chamber comprises a resilient membrane installed co-axially with the tubular chamber shell so that a cavity is formed in the gap between the membrane and shell, which is connected with a gas medium source. If the gas medium is alternately supplied into the cavities so that a certain pressure difference is built up, the resilient membranes will oscillate in the sections, thereby causing movement and agitation of the liquid within the tubular chamber. (See, for instance, the USSR Inventor's Certificate No. 484012 of 1972 "Device to Cause Low-Frequency Oscillations in Liquid"). Although this novel device ensures a high energy concentration of low-frequency oscillations per unit volume and uniform distribution of the energy throughout the chamber volume and, hence, a uniform agitation of the liquid, the device suffers from a number of disadvantages inherent in its design.

One inherent disadvantage of the most intrinsic character consists in that the resilient membrane installed inside the shell with a gap relative to the wall has several degrees of freedom, which causes high-degree modes of membrane oscillations, resulting in a decrease of transfer of low-frequency oscillations to the liquid and, hence, in an impairment of the mixing process. Moreover, the gas medium inlet hole may be blocked by the resilient membrane, which will render it impossible to change the pressure inside the cavity as required and will promote wear of the membrane.

It is known that attempts were made to use such liquid stirring devices in installations for treatment (primarily for purification) of loose materials. Such an installation consists of a number of above described liquid stirring devices arranged in series according to the flow and provided with a gas medium source to actuate said membranes and with a hopper for loading loose materials into the first of the said chambers.

However, such installations are not reliable in service due to the above stated disadvantages inherent in liquid-stirring devices of that type.

It is an object of the present invention to provide a liquid-stirring device, in which low-frequency oscillations of the membrane predominantly in the zero mode are induced.

Another object of the invention is to raise the efficiency and enhance the reliability of the liquid stirring device.

Among other objects of the present invention should be particularly emphasized the possibility of attaining maximum amplitude of low-frequency oscillations in a device of the described type provided with a membrane inside a tubular chamber.

A further object of the present invention is to provide a more reliable and efficient installation for treatment of materials in a flow of agitated liquid.

These and other objects of the invention have been accomplished by providing a liquid stirring device which comprises a tubular chamber filled with agitated liquid, said chamber being divided by a rigid annular partition into two sections each accommodating a resilient membrane disposed coaxially with a gap relative to the inside surface of the shell and forming a cavity in the gap communicating with a gas medium source which is used to alternately supply the gas medium at a variable pressure to build up a certain pressure difference between the said sections and to move the resilient membrane, thereby causing agitation of the liquid. According to the invention, each section accommodates also a rigid perforated support member installed co-axially in the cavity between the membrane and the tubular chamber shell at a certain distance from the chamber wall so that the membrane rests on its support member, when no gas medium is supplied into the cavity.

The arrangement of the resilient membranes on the perforated support members makes it possible to define the minimum volume of each gas-filled cavity and reduce wear of the resilient membranes. In this case the membranes will contract and expand symmetrically, and oscillations induced by the membranes will be substantially of the zero mode. All these innovations contribute to the efficiency and operating reliability of the device.

It is expedient to hold the membrane tight against the perforated support member in the upper part in order to concentrate the energy of oscillations at the lower part of the cavity, which is of a paramount importance for simultaneous agitation of the liquid and transfer of the material from one section to another.

To increase the reliability of the device, it is worthwhile to connect at least one of the sections of each tubular chamber with a receiver to contain part of the liquid bled from the chamber in case of an excessive pressure. This receiver may be connected with the tubular chamber interior via a hole made in the vicinity of the annular partition. According to one of the exemplary embodiments, excessive liquid is bled into an enlargement of the chamber used as a receiver and communicating with the chamber interior via a through-slot made in the upper part of the chamber shell. A similar slot may be used for loading loose materials to be treated by the agitated liquid in the device.

An installation for treatment of loose materials in a flow of agitated liquid may be constructed by using the above described devices arranged in succession in the direction of the flow and representing chambers provided with membranes actuated under the effect of a gas medium supplied at a variable pressure, with a perforated support member disposed as described above, and with a hopper for loading loose materials into the first of said tubular chambers. The membrane of at least the first section initially receiving the loose materials should be held motionless in the upper part.

It is preferable that the first section of the installation be connected with the hopper through the medium of a special pneumatic vibratory-type feeder which is a tubular member accommodating a resilient membrane installed co-axially with the tubular member shell with a certain gap from the latter to form an annular cavity connected with the same gas medium source used to supply working medium into the said liquid-stirring devices.

The installation of this kind will incorporate all the advantages of the above described chambers. The provision of said hopper in conjunction with the pneumatic vibratory-type feeder assures continuous and reliable operation of the installation. In addition, it is worthwhile mentioning that the pneumatic vibratory-type feeder is actuated by the gas medium supplied from the same gas medium source as the liquid-stirring devices, which makes the construction and operation of the entire installation much simpler.

Specific embodiments of the invention will now be described by way of example with reference to the accompanying drawings, in which:

FIG. 1 is a vertical sectional view, partly in elevation, showing a liquid-stirring device embodying the invention;

FIG. 2 is a cross section on the line II—II of FIG. 1;

Figure 3:
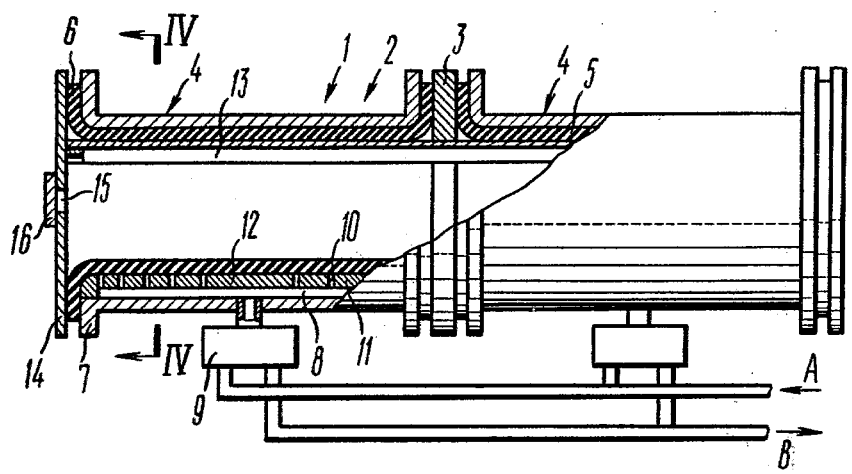
FIG. 3 is a vertical sectional view, partly in elevation, showing a modified embodiment of a liquid-stirring device with a membrane held motionless at the top.

FIGS. 1 and 2 show general views of the liquid-stirring devices which can be used to advantage for washing piece items, for instance, for washing contaminated engines. It can also be used for washing dirty parts of machinery, machine and hand tools. The inventive concept underlying the design of each device can be used as a basis for construction of domestic washing machines.

The device marked in general with numeral 1 (FIGS. 1 and 2) comprises a tubular chamber 2 divided by a rigid annular partition 3 into two structurally identical sections 4. Installed in each section 4 is a resilient membrane 5 made of an elastic material whose modulus of elasticity allows expansion and contraction of the membrane at a preset amplitude. The ends of each membrane are flanged outside to form collars 6 held tight against the end faces of the shell 7 of the tubular chamber 2 and the rigid annular partition 3. The resilient membrane 5 is installed so that an annular gap is formed between the membrane and the shell 7 of the tubular chamber 2. The above described flanged joints and method of installation of the membrane 5 result in formation of cavity 8 communicating with a gas medium source (not shown in the figure) via a special slide valve arrangement 9 and pipes A and B. One of the pipes is intended to deliver gas medium (air) into the cavities, the other, to evacuate air from the cavities.

The slide valve arrangements 9 are synchronized functionally so that when one of them is open to supply compressed air into the cavity of one chamber section, the other is set to evacuate the contents of the cavity of the other chamber section. As a result of alternating delivery and discharge of air the membranes 5 execute oscillatory motion ensuring agitation of the liquid supplied into the tubular chamber 2. A cylindrical perforated support member 10 made of a strong material, preferably of steel, is disposed co-axially between the membrane 5 and shell 7 of the tubular chamber 2. Perforations 11 are spaced uniformly all over the surface of the support member 10, except the member area 12 where the gas medium is admitted into the cavity 8. It goes without saying that the cylindrical configuration of the support member 10 is not insisted upon, its shape being dictated by the configuration of the shell 7, tubular chamber 2 and membrane 5. But it is imperative that this member 10 be disposed co-axially with the shell 7 of the tubular chamber 2. The above described device may be advantageously used for cleaning bulky parts attached appropriately inside the chamber section 4. The part suspension system does not form the subject matter of this application and may be designed depending on the size, shape and other characteristics of the particular item to be cleaned.

Figure 4:
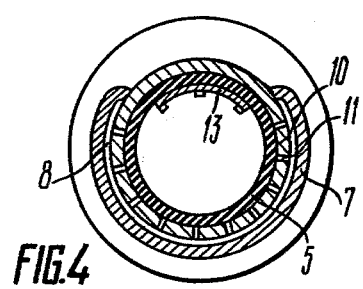
FIG. 4 is a cross section on the line IV—IV of FIG. 3.

It is difficult, however, to keep loose materials in a suspended state, as they will tend to accumulate in the bottom part of the tubular chamber 2. Therefore, it is expedient to ensure that the lower part of the membrane 5 oscillates at a higher degree. FIGS. 3 and 4 show a liquid-stirring device of that particular type, whose component parts identical with those of the device shown in FIGS. 1 and 2 are indicated by the same reference numerals. The only difference between the device shown in FIGS. 3 and 4 and that presented in FIGS. 1 and 2 consists in that the membrane 5 is held firm at the top by a strip 13. Needless to say that the upper part of the membrane 5 thus secured remains motionless, and energy of oscillations is transmitted only from the lower part, thereby improving the conditions for treatment of loose materials.

Covers 14 are provided in the devices shown both in FIGS. 1 and 2 and FIGS. 3 and 4 to close the ends of the tubular chamber 2. One of the covers has a hole 15 closed with a plug 16 and used to pour liquid into the chamber.

To operate the proposed device for washing a bulky part, proceed as follows: install the part (not shown)

inside the tubular chamber 2, reinstall the covers 14 and pour washing liquid into the hole 15. Close the hole 15 with the plug 16. Operate the gas medium source to supply the gas medium through the slide valve arrangement 9 into the cavity 8 of one section 4 and evacuate the gas medium from the cavity of the other section 4. Suppose the gas medium is initially delivered into the left-hand section 4 to pass through the holes 11 in the perforated support member 10 and deflect the membrane to the axis of the section 4. Since air is simultaneously evacuated from the cavity 8 of the right-hand section 4, a pressure difference is built up. The liquid flows from one section 4 into the other via the annular partition 3. The oscillation frequency of the membranes 5 in the two sections 4 is set in accordance with the resiliency of the membranes and the mass of the liquid to be agitated. The membranes 5 actuated in succession execute an oscillatory motion with a phase shift up to 180°, which makes it possible to localize the oscillatory motion of the liquid within the confines of the tubular chamber 2 and ensure agitation of the liquid.

The above described device offers satisfactory performance in case the chamber is but partially filled with the liquid so that a sufficient air space is left to permit maximum displacement of the liquid.

However, the liquid-stirring device provided with the rigid strip holding the membrane and reducing its working area does not permit high power generation within the entire installation. Therefore, it is proposed to make use of a liquid-stirring device with a tubular chamber filled to capacity, in which case one of the sections 4 of the tubular chamber 2 must be connected with a void designed to receive some liquid, if an excessive rise of pressure occurs.

Figure 5:
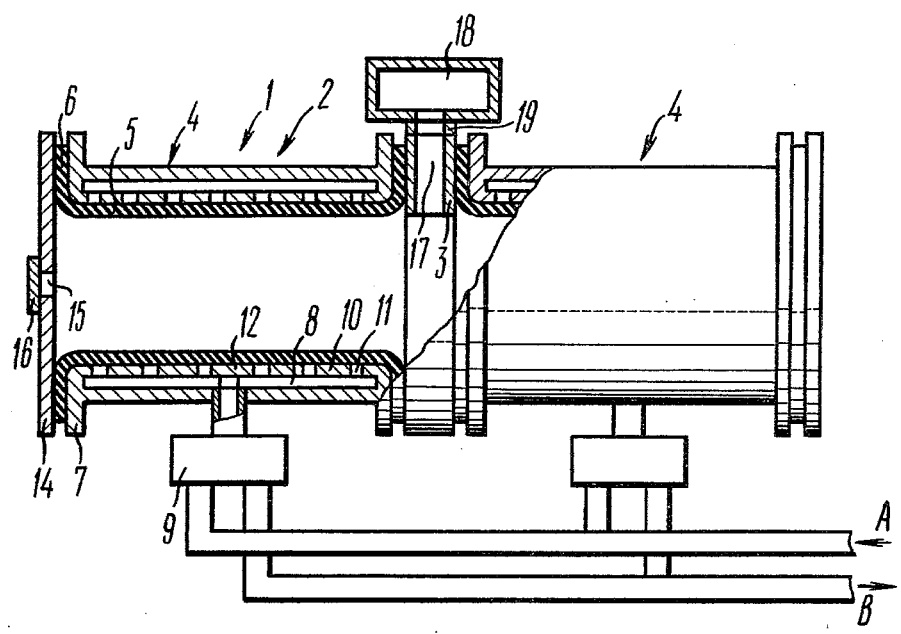
FIG. 5 is a modified embodiment of a version of the liquid-stirring device provided with a means for bleeding excessive liquid in operation.

FIG. 5 shows a device capable of attaining maximum power, which is substantially similar in construction with those shown in FIGS. 1, 2, 3 and 4. Identical component parts are marked in FIG. 5 with the same reference numerals as in FIGS. 1, 2, 3 and 4. The only difference consists in that a through-hole 17 is made in the rigid annular partition 3 to intercommunicate the interior of the tubular chamber 2 and receiver 18 of variable holding capacity (for instance, a bellows) via a tube 19. The liquid-stirring device provided with a receiver is operated basically in the same way as the devices previously described. The pressure arising due to contraction of the membrane within the section 4 in the tubular chamber 2 filled with the liquid to capacity is kept at a minimum, because part of the liquid is transferred into the receiver 18.

Figure 6:
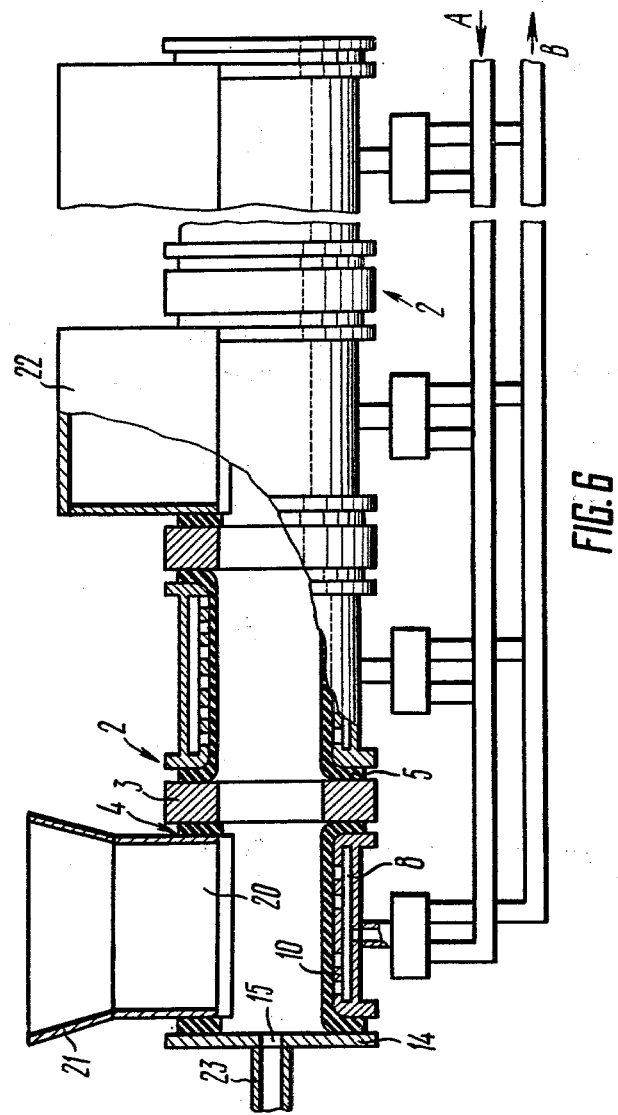
FIG. 6 shows a version of an installation incorporating a modified embodiment of a liquid-stirring device for treatment of loose materials in a flow of agitated fluid.

The liquid-stirring device under consideration may be used for construction of an installation for treatment of loose materials. The installation illustrated in FIG. 6 consists of a number of similar tubular chambers 2 constructed substantially as the chamber described hereinabove with reference, for example, to FIGS. 3 and 4. The membrane 5 in the left-hand section 4 of each tubular chamber is held firm against the shell 7 at the top, while the membrane 5 in the right-hand section 4 of each tubular chamber is free to move in the upper part. A through-slot 20 is made throughout the shell and perforated member in the upper part of the left-hand section of each tubular chamber. A hopper 21 is installed above the slot in one of the tubular chambers and receivers 22 used to relieve the chamber of liquid overpressure are mounted above the slots on the top of all the succeeding chambers. Liquid is supplied through a pipe 23 connected to the cover 14 of the tubular chamber 2. Let us consider the operation of this installation in brief, supposing the operation of the tubular chambers proper is clear from the foregoing description. Loose material poured into the hopper 21 and entrained by the liquid found in the tubular chamber 2, moves from one section 4 to the following one together with the fluid flow, being treated by the liquid at the same time. The number of the tubular chambers is chosen depending on the required treatment conditions (cleaning, mixing, etc.). Loose material of the desired characteristics is obtained at the outlet of the last section.

Figure 7:
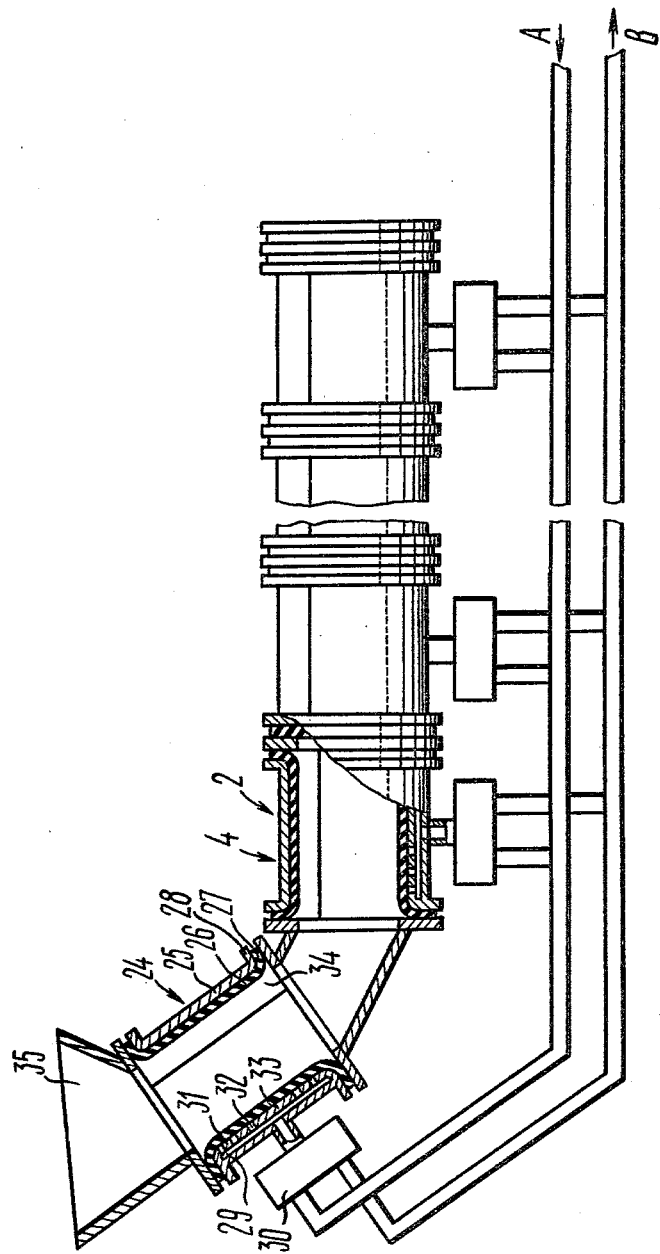
FIG. 7 shows a modified embodiment of the installation for treatment of loose materials in a flow of agitated liquid.

Shown in FIG. 7 is another practical version of the installation, comprising a large number of the tubular chambers 2 and functioning as described hereinabove. The loading hopper 35 of the installation is connected to the left-hand section of the first tubular chamber 2 through the medium of a pneumatic vibratory-type feeder 24. The membrane of the first section of this chamber is likewise held motionless at the top. The pneumatic vibratory-type feeder 24 is made in the form of a tubular member 25 containing a membrane 26 of an elastic material allowing the membrane to contract and expand alternately at a predetermined amplitude. The ends of the membrane 26 are flanged outside to form collars 27 tightened up by the flanges 28 of the tubular member 25. The membrane 26 is disposed inside the tubular member 25 with a certain gap. Due to these flanged joints and respective location of the membrane 26 a cavity 29 is formed to receive the gas medium supplied through the slide valve arrangement 30. A bearing member 31 with its side surface perforated is disposed between the membrane and shell of the tubular member 25. Perforations 32 are spaced uniformly all over the side surface of the bearing member 31, except the member area 33 where the gas medium is admitted into the cavity. The membrane 26 is held tight against the shell in the upper part by means of a strip 34. The upper part of the tubular member 25 is cut away, the tubular member side edges are pressed tight against the outside surface of the bearing member 31, in which case the exposed area of the bearing member 31 is not perforated.

Loose material is loaded into this installation in the following way. From the hopper 35 loose material and washing liquid are poured into the tubular member 25 of the pneumatic vibratory-type feeder 24. Gas medium is simultaneously supplied into the cavity 29 by means of the slide valve arrangement 30. The gas medium at a variable pressure passes through the holes 32 in the perforated bearing member 31, changing the pressure inside the cavity 29 from a high surplus pressure to rarefaction, thereby causing the membrane 26 to oscillate. When the membrane 26 contracts inside the tubular member 25, the loose material is pushed along the feeder under the gravity effect. When the membrane 26 expands, the loose material moves under gravity from the hopper 35 into the pneumatic vibratory-type feeder 24, filling the vacated space. The operating principle of the installation shown in FIG. 7 does not differ much from that of the installation presented in FIG. 6. It should be emphasized that the membrane of the feeder must be held motionless in the upper part to ensure better results in treatment of loose materials.

While the invention has been described in but several preferred embodiments, it will be obvious to those skilled in the art that it is susceptible of various changes and modifications without departing from the spirit of the present invention.

For example, the upper part of the shell 7 (see FIGS. 1 and 3) of the tubular chamber 2 may be cut away, the shell side edges may be pressed tight against the outside surface of the support member 10, in which case the exposed area of the support member 10 is not to be perforated and a more uniform distribution of pressure on the membrane surface is achieved.

In the proposed device the perforated support member is supposed to be made from stainless steel, but it is evident for those skilled in the art that use can be made of any other material strong enough to withstand the membrane pressure. The membrane is actuated by a gas medium, for instance, by compressed air. It is obvious that the kind of the gas medium is determined by the field of application of the above described devices.

What is claimed is:

1. In a liquid-stirring device comprising a shell defining a tubular chamber, a rigid annular partition dividing said tubular chamber into two sections, each provided with a resilient membrane adapted to enclose said liquid and installed co-axially with the shell of said tubular chamber with a gap relative to the chamber wall so as to form a cavity between the membrane and the shell, and a gas medium source connected to each of the said sections so that the gas medium delivered into the sections creates a pressure difference by means of the membranes actuated by the said gas medium and causing the liquid to move and agitate, the improvement comprising a rigid perforated support member stationarily mounted in each cavity-forming gap between and co-axially with the membrane and tubular chamber shell in each section with a certain radial clearance from the shell so that when the gas medium is not supplied into the cavity, the membrane rests on the perforated support member.

2. A device according to claim 1, wherein the membrane is held motionless in the upper part of each section by means of a strip.

3. A device according to claim 1, wherein at least one of the tubular chamber sections is connected, by means of a hole in the rigid annular partition, with a receiver to contain part of the liquid in case an excessive pressure occurs in the tubular chamber.

4. A device according to claim 3, wherein the liquid receiver communicates with the tubular chamber interior via a hole made in the area where the rigid annular partition is located.

5. A device according to claim 4, wherein the liquid receiver is variable in holding capacity.

6. A device according to claim 2, wherein a slot is made throughout the chamber shell in the upper part of each section where the membrane is held motionless and the shell is enlarged outside the chamber to provide room for part of the liquid.

7. A device according to claim 1, wherein the perforated support member is made solid in the area where the gas medium is admitted into the cavity.

8. An installation for treatment of loose materials in a flow of agitated liquid, comprising a number of liquid-stirring devices arranged in series and connected with each other in the direction of the flow of the liquid, each of said liquid-stirring devices comprising in combination a shell defining a tubular chamber divided by a rigid annular partition into two sections each provided with a resilient membrane adapted to enclose said fluid and installed coaxially with the shell of said tubular chamber with a certain annular gap relative to the shell inside wall to form a cavity in between for admission of a gas medium and deflection of the membrane which is held motionless by means of a strip in the upper part of the first section used for loading the material to be treated, with a rigid perforated support member disposed stationarily within said cavity between the membrane and chamber wall at a certain radial distance from the latter so that the membrane rests on the perforated support member when no gas medium is supplied into the cavity, with a gas medium source connected with said gas-filled cavities so that a certain pressure difference is built up between the sections to impart the required oscillatory movement of the membranes with a resultant agitation of the liquid, and with a hopper to load the material to be treated, said hopper being communicated with the first section of the first chamber.

9. An installation according to claim 8, wherein a throughslot is made in the upper part of the first section, where the membrane is held motionless by means of a strip, to communicate the hopper with the interior space of the said section and deliver loose material to be treated into the chamber in a direction normal to the direction of the flow of the liquid.

10. An installation according to claim 8, wherein said hopper is connected with the first section of the tubular chamber through the medium of a pneumatic vibratory-type feeder installed at the inlet to the first section at a certain angle and comprising a feeder shell defining a feeder tubular member which accommodates a rigid perforated feeder support member installed co-axially with the feeder tubular member shell with a certain clearance relative to the feeder shell inner surface and used to support a feeder resilient membrane forming a cavity which is connected with said gas medium source by means of a slide valve arrangement.

11. A device according to claim 5 wherein said receiver is a bellows.

* * * * *